US 6,644,544 B1

(12) United States Patent
Spurr et al.

(10) Patent No.: US 6,644,544 B1
(45) Date of Patent: Nov. 11, 2003

(54) IMAGING APPARATUS CAPABLE OF FORMING AN IMAGE CONSISTENT WITH TYPE OF IMAGING CONSUMABLE LOADED THEREIN AND METHOD OF ASSEMBLING THE APPARATUS

(75) Inventors: Robert W. Spurr, Rochester, NY (US); Kurt M. Sanger, Rochester, NY (US); Timothy J. Tredwell, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/334,021

(22) Filed: Jun. 16, 1999

(51) Int. Cl.[7] .............................................. G06F 17/00

(52) U.S. Cl. ..................................... 235/375

(58) Field of Search .................... 235/375; 358/502, 358/401; 347/214

(56) References Cited

U.S. PATENT DOCUMENTS

| 4,663,625 A | 5/1987 | Yewen |
| 4,742,470 A | 5/1988 | Juengel |
| 4,806,958 A | 2/1989 | Monot et al. |

(List continued on next page.)

FOREIGN PATENT DOCUMENTS

| EP | 0 443 443 A2 | 8/1991 |
| EP | 0 509 520 A2 | 10/1992 |
| EP | 0 873 873 A2 | 12/1997 |
| WO | 98/52762 | 11/1998 |

OTHER PUBLICATIONS

TEMIC Semiconductors TK5550, Read/Write Transponder, Telefunken Semiconductors, Rev. A1, Apr. 30, 1997.
TEMIC Semicondutors e5550, Standard Read/Write Identification IC, Telefunken Semiconductors, Rev. A3, Mar. 17, 1998.
U.S. 09/133,114 titled: A Printer With Media Supply Spool Adapted To Sense Type Of Media, And Method Of Assembling Same, filed Aug. 12, 1998 in the name of Spurr et al.
U.S. 09/218,595 titled: A Printer With Donor And Receiver Media Supply Trays Each Adapted To Allow A Printer To Sense Type Of Media Therein, And Method Of Assembling The Printer And Trays, filed Dec. 22, 1998 in the name of Spurr et al.

Primary Examiner—Karl D. Frech
Assistant Examiner—Lisa M Caputo
(74) Attorney, Agent, or Firm—Norman Rushefsky

(57) ABSTRACT

Imaging apparatus capable of forming an image consistent with type of imaging consumable loaded therein, and method of assembling the apparatus. The imaging apparatus reports the consumable type and manufacturer batch identification to a remote computer. The remote computer responds by returning batch-specific information that may affect processing parameters for the imaging apparatus. In the preferred embodiment, an electrically programmable read/write memory contained in a transponder is integrally attached to the consumable package. The transponder communicates with a transceiver, disposed within the imaging apparatus. The transceiver has antenna and support components for polling each transponder. As instructed by a control logic processor, the transceiver can both read manufacturing data from the transponder about the consumable and write usage and processing data to the transponder for storage in memory. A networked server connects to the control logic processor and to a network for communication with remote computer.

38 Claims, 6 Drawing Sheets

U.S. PATENT DOCUMENTS

| | | |
|---|---|---|
| 5,008,661 A | 4/1991 | Raj |
| 5,019,815 A | 5/1991 | Lemelson et al. |
| 5,049,898 A | 9/1991 | Arthur et al. |
| 5,049,904 A | 9/1991 | Nakamura et al. |
| 5,078,523 A | 1/1992 | McGourty et al. |
| 5,104,247 A | 4/1992 | Ohshima |
| 5,105,190 A | 4/1992 | Kip et al. |
| 5,184,152 A | 2/1993 | French |
| 5,185,315 A | 2/1993 | Sparer |
| 5,196,862 A | 3/1993 | Fisher, Sr. |
| 5,220,352 A * | 6/1993 | Yamamoto et al. .......... 346/17 |
| 5,224,784 A | 7/1993 | Haftmann et al. |
| 5,266,968 A | 11/1993 | Stephenson |
| 5,268,708 A | 12/1993 | Harshbarger et al. |
| 5,291,420 A | 3/1994 | Matsumoto et al. |
| 5,297,881 A | 3/1994 | Ishiyama |
| 5,305,020 A | 4/1994 | Gibbons et al. |
| 5,318,370 A | 6/1994 | Nehowig |
| 5,331,338 A | 7/1994 | Mager |
| 5,342,671 A | 8/1994 | Stephenson |
| 5,343,276 A | 8/1994 | Yamashita et al. |
| 5,365,312 A | 11/1994 | Hillmann et al. |
| 5,402,361 A | 3/1995 | Peterson et al. |
| 5,426,011 A | 6/1995 | Stephenson |
| 5,430,441 A | 7/1995 | Bickley et al. |
| 5,455,617 A | 10/1995 | Stephenson et al. |
| 5,491,327 A | 2/1996 | Saroya |
| 5,491,468 A | 2/1996 | Everett et al. |
| 5,493,385 A | 2/1996 | Ng |
| 5,504,507 A | 4/1996 | Watrobski et al. |
| 5,513,920 A | 5/1996 | Whritenor et al. |
| 5,517,282 A | 5/1996 | Yamashita et al. |
| 5,562,352 A | 10/1996 | Whritenor et al. |
| 5,565,906 A | 10/1996 | Schoon |
| 5,598,201 A | 1/1997 | Stodder et al. |
| 5,600,350 A | 2/1997 | Cobbs et al. |
| 5,600,352 A | 2/1997 | Knierim et al. |
| 5,610,635 A | 3/1997 | Murray et al. |
| 5,620,265 A | 4/1997 | Kondo |
| 5,634,144 A | 5/1997 | Mauro et al. |
| 5,647,679 A | 7/1997 | Green et al. |
| 5,661,515 A | 8/1997 | Hevenor et al. |
| 5,713,288 A | 2/1998 | Frazzitta |
| 5,755,519 A | 5/1998 | Klinefelter |
| 5,757,394 A | 5/1998 | Gibson et al. |
| 5,774,639 A | 6/1998 | Schildkraut et al. |
| 5,812,156 A | 9/1998 | Bullock et al. |
| 5,835,817 A | 11/1998 | Bullock et al. |
| 5,860,363 A | 1/1999 | Childers et al. |

OTHER PUBLICATIONS

U.S. 09/133,122 titled: *A Printer Media Supply Spool Adapted To Allow The Printer To Sense Type Of Media, And Method Of Assembling Same*, filed Aug. 12, 1998 in the name of Spurr et al.

U.S. 09/292,859 titled: *A Photoprocessing Apparatus And Method Of Sensing Type Of Photoprocessing Consumable*, filed Apr. 16, 1999 in the name of Spurr et al.

* cited by examiner

IMAGING APPARATUS CAPABLE OF FORMING AN IMAGE CONSISTENT WITH TYPE OF IMAGING CONSUMABLE LOADED THEREIN AND METHOD OF ASSEMBLING THE APPARATUS

FIELD OF THE INVENTION

This invention generally relates to image processing apparatus and methods and more particularly relates to an imaging apparatus capable of forming an image consistent with type of imaging consumable loaded therein, and method of assembling the apparatus.

BACKGROUND OF THE INVENTION

A typical image processing apparatus may be a photoprocessing or printing apparatus that forms a high-quality image from an image source onto a viewable medium. An image source for a high-quality image can be an exposed roll of film or digital data obtained from a scanner, digital camera, graphics art software system, electrophotographic system or other digital source. The print operation may use inkjet technology, a thermal printhead, or exposure means (such as conventional light exposure, a laser, an LED, or a scanning CRT).

To provide its output image, the image processing apparatus uses one or more of the following consumables: paper, film, cardboard, textile, or other media on which the image is printed, including photosensitive media (paper or film) where the image is written using radiant exposure energy; chemicals, such as developer, fixer, and bleach solutions used in photoprocessing; inks and cleaning fluids used in inkjet printers; toners; ribbons, including thermal print ribbons; and laminates used to prepare or preserve the printed surface before or after imaging.

For high-quality imaging, particularly when accurate color reproduction is important, customers who operate image processing apparatus desire to optimize processing variables to obtain the best image quality and to reduce waste. To achieve this result, image processing apparatus typically includes a front-end computer that can adjust operational variables during printing.

The consumables used in imaging systems of this type are manufactured to high quality standards, with sensitometry, formulations, and other variables maintained to within tight tolerances. Included in the tolerance considerations are margins for worst-case conditions that might affect performance of the consumables. For example, the manufacturer of the consumable often does not know beforehand the specific type of imaging apparatus by manufacturer and model into which a consumable will be loaded. Similarly, the manufacturer must allow for numerous possible consumable batch interactions. For example, in the case of a photoprocessing minilab, a specific batch of photosensitive paper manufactured today could be processed using a specific batch of chemicals manufactured several months previously. Batch-to-batch variations with color film, photosensitive color paper, and chemicals are known to exist and different batches can interact in different ways, thereby affecting image quality.

Today, manufacturers are constrained to tight tolerances and higher costs due, in part, to such worst-case conditions. At the same time, however, a significant amount of testing and data-gathering is routinely performed on each manufactured batch of consumable. This type of detailed information about each batch, if it were available to customers who own and operate imaging equipment, could be used to meet the customers desire to optimize performance of the image processing apparatus using these consumables.

Today, conventional process control strategies employ feedback data obtained largely from control strips or test prints generated by the image processing apparatus. Measurements from control strips or test prints show the results of the completed imaging process, allowing response adjustments that are a reaction to process variation. However, such reactive methods for process control do not provide effective ways to take advantage of data obtained from testing during consumables manufacture. Instead, conventional methods only use data obtained after processing. It would be advantageous to be able to use data obtained during consumables manufacture in order to predict process results prior to processing. Methods for obtaining up-to-date information on consumables loaded in an apparatus would help to provide an improved measure of control of the operation of a photoprocessing or printing apparatus. However, there is no practical method for providing this type of data regarding consumables supplied to customers who operate photoprocessing or printing apparatus, which data would allow such apparatus to predict and compensate for batch-to-batch interactions.

In particular, the owner of a minilab or other photoprocessing apparatus pays close attention to image quality and is encouraged to follow a set of recommended practices for cleanliness, storage, and stock rotation for consumables. Notably, because of economic and environmental concerns, it is advantageous for manufacturers of minilabs to provide a high degree of control over the processing operation, including providing as much information as is necessary about process variables in order to economically obtain best quality with minimum waste. To facilitate this tight control, many minilabs include front-end computers that act as control processors and provide various sensing and reporting capabilities for the minilab operator. Among example systems that provide this capability are the "Noritsu QSS-2xxx" series minilabs manufactured by Noritsu Koki Company, Ltd., located in Wakayama, Japan.

It would be advantageous for the control program that runs in the front-end computer of an image processing apparatus to be able to access information about its loaded consumables. Data such as batch number, date of manufacture, emulsion type (for photosensitive paper), sensitometric information, color transforms, and other application-specific information could be used to facilitate handling and processing of each consumable paper or chemical.

Detailed, batch-specific information about the consumable could be stored with the consumable itself. Results of sensitometric or formulation testing, for example, could be provided with a consumable in a number of ways. Providing printed information on the consumable package or container itself is one option; however, this would constrain the consumables manufacturer to very tight schedules for batch testing and is not easily usable by an operator. Bar-code labeling is another option, but this requires either careful operator procedure (scanning each consumable prior to loading) or multiple readers disposed within the apparatus, one for each consumable package. Bar-codes can store only a limited amount of information. Embedded trace patterns, as disclosed in International Publication Number WO 98/52762 by Purcell, et al., could be used to identify a consumable type. However, this type of data encoding is fairly inflexible with respect to data storage and provides very little information. Another alternative is storage of test and manufacturing information on a memory IC that is integrally attached to the consumable. Integration of a memory with the consumable enables storage of a significant amount of detailed data for the consumable and allows added advantages such as tracking of consumables usage. Each of these solutions offers the capability to store some information about a consumable. However, none of these solutions allow changes to information in instances where new data becomes available after the consumable is manufactured and shipped to the customer. Some of the detailed information may need to be changed or altered for effective use of the consumable. In addition, a manufacturer may even wish to recall a specific batch of consumable.

Imaging apparatus for high-quality imaging are often connected to a network, possibly through an intermediate computer acting as a network server. This connection allows digital image data files to be transferred from other networked computers. Network connection can be made to one or more local (nearby) computers or even to a wide-area network that is accessible to computers in distant parts of the world. Network connection has been widely used for remote diagnostics and to help maintain computer-based devices, including, for example, printers and instruments. Taking advantage of remote networking capabilities such as those provided by the Internet and, more generally, by high-speed telecommunications means, remote diagnostics allow a diagnosing computer to communicate with any networked device to which it has access and to poll that device for status, error codes and conditions, usage counts, and other operational data. In this way, remote diagnostics allow a host diagnosing computer to assist technical support personnel in solving problems reported by customers. In this regard, U.S. Pat. No. 5,291,420 to Matsumoto et al. discloses a remote management system for photographic equipment, including minilabs, that serves as such a diagnostic and information-gathering system. The types of information obtained from the minilab using the methods of U.S. Pat. No. 5,291,420 include densitometry data obtained from a control strip that;is processed on a specific photoprocessing apparatus. U.S. Pat. No. 5,291,420 also teaches reporting of usage information to assist in inventory control.

Similarly, U.S. Pat. No. 5,402,361 to Peterson et al. discloses networked connection of color processing equipment, including minilabs, for the purpose of providing measured process control information from such equipment. Here, densitometer data, obtained from reading control strips processed by the equipment, is made available to a networked host computer for analysis. Correction factors, computed at a remote host computer based on this data, can then be transmitted back to the color processing equipment.

Other networked arrangements for gathering data from remote image processing equipment are disclosed in U.S. Pat. Nos. 5,343,276 and 5,517,282 both issued to Yamashita et al. where usage data (number of copies processed) is obtained from networked equipment for use in scheduling field maintenance visits.

Thus, although it can be seen that there are network arrangements that allow some communication of data from image processing and photoprocessing equipment (including minilabs) with a host computer, these network arrangements focus on obtaining process measurements from control strips and usage data for diagnostic purposes. None of these network arrangements give an automated method to provide specific information to the imaging apparatus on its loaded consumables. Moreover, none of these network arrangements allow the consumables manufacturer to update customers with the latest information on specific batches of consumables being used.

It can therefore be seen that it would be beneficial to provide access, using networked connection, to specific information about the consumables loaded in an image processing apparatus not only for diagnostic purposes, but more importantly, for the purpose of predicting consumables interactions in the image processing apparatus in order to optimize the image quality provided by such an apparatus.

SUMMARY OF THE INVENTION

An object of the present invention is to provide an imaging apparatus including an image forming assembly having a network connection to a remote host computer in order to obtain updated imaging information concerning imaging consumables loaded in the apparatus.

With this object in view, the present invention resides in an imaging apparatus capable of forming an image consistent with type of imaging consumable loaded therein, comprising an identifier associated with the consumable, the identifier defining identifier information identifying the type of consumable; an image forming assembly for forming the image according to the identifier information; a data source remotely disposed with respect to the image forming assembly, the data source containing image forming information corresponding to the identifier information; and a telecommunications link linking the identifier to the data source for carrying the identifier information from the identifier to the data source and linking the data source to the image forming assembly for carrying the image forming information from the data source to the image forming assembly, so that the image is formed consistent with the type of the consumable loaded in said image forming assembly.

According to an aspect of the present invention, the imaging apparatus includes memory circuitry that is capable of storing detailed information regarding an imaging consumable to be loaded in the apparatus. In this regard, the imaging apparatus includes a front-end computer. When a new consumable is loaded into the apparatus, a product and batch identification code associated with the consumable is stored on the front-end computer. In a network file transfer operation, the front-end computer transmits the product and batch identification code to a remote host computer. In response, the remote host computer transmits back to the front-end computer a file containing batch-specific processing and manufacture imaging information for using that consumable. The apparatus uses the imaging information to provide a quality image consistent with the type of consumable being used.

In another aspect of the present invention, the apparatus includes a communications link to a remote host computer from an imaging apparatus that is adapted to sense type of consumable loaded therein. In this regard, a radio-frequency transceiver transmits a first electromagnetic field and senses a second electromagnetic field. A transponder, having a non-volatile memory and the image forming information stored in the memory, is mounted on the consumable. The transponder is spaced apart from the radio-frequency transceiver and is capable of receiving the first electromagnetic field from the transceiver and generating a second electromagnetic field in response to the first electromagnetic field received thereby. The second electromagnetic field is characteristic of the image forming information stored in the memory. The apparatus also includes a networked computer which is connected to an image forming assembly and configured to transfer the image forming information associated with the imaging consumable from the image forming assembly to the remote host computer. The networked computer is also configured to transfer the image forming information from the remote host computer to the imaging apparatus.

An advantage of the present invention is that use thereof obviates need for operator entry of data describing the consumable loaded in the apparatus. Instead, use of the invention automates obtaining information identifying the consumable.

Another advantage of the present invention is that use thereof allows control logic in the imaging apparatus to automatically determine the type of consumable that is loaded and to obtain the most recent available data regarding the consumable, such as manufacturing date, batch number, and chemical type.

Yet another advantage of the present invention is that use thereof allows the imaging apparatus to adapt to interacting consumables loaded therein, so that, for example, a media consumable from a first batch can be processed optimally when used with consumable chemicals from a second batch.

A further advantage of the present invention is that use thereof allows a host computer at a remote site to determine which specific consumables are installed in an apparatus. This is useful for consumable inventory tracking. Additionally, the remote computer can also communicate information to the imaging apparatus on product recalls or on use recommendations.

These and other objects and advantages of the present invention will become apparent to those skilled in the art upon a reading of the following detailed description when taken in conjunction with the drawings wherein there are shown and described illustrative embodiments of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 1:
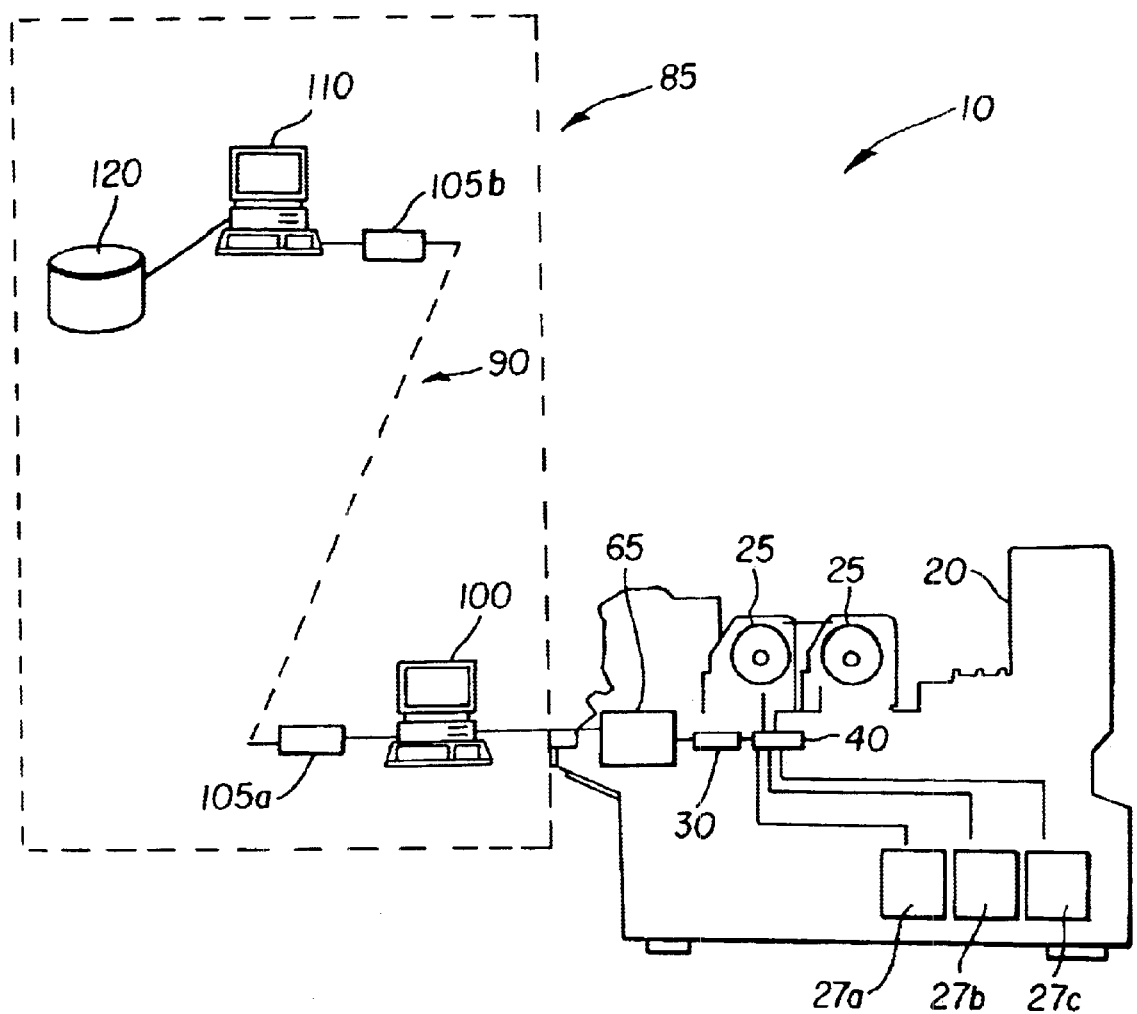
FIG. 1 is a view in elevation of an imaging apparatus adapted to sense the consumables loaded therein, the imaging apparatus including a communications link.
Figure 2:
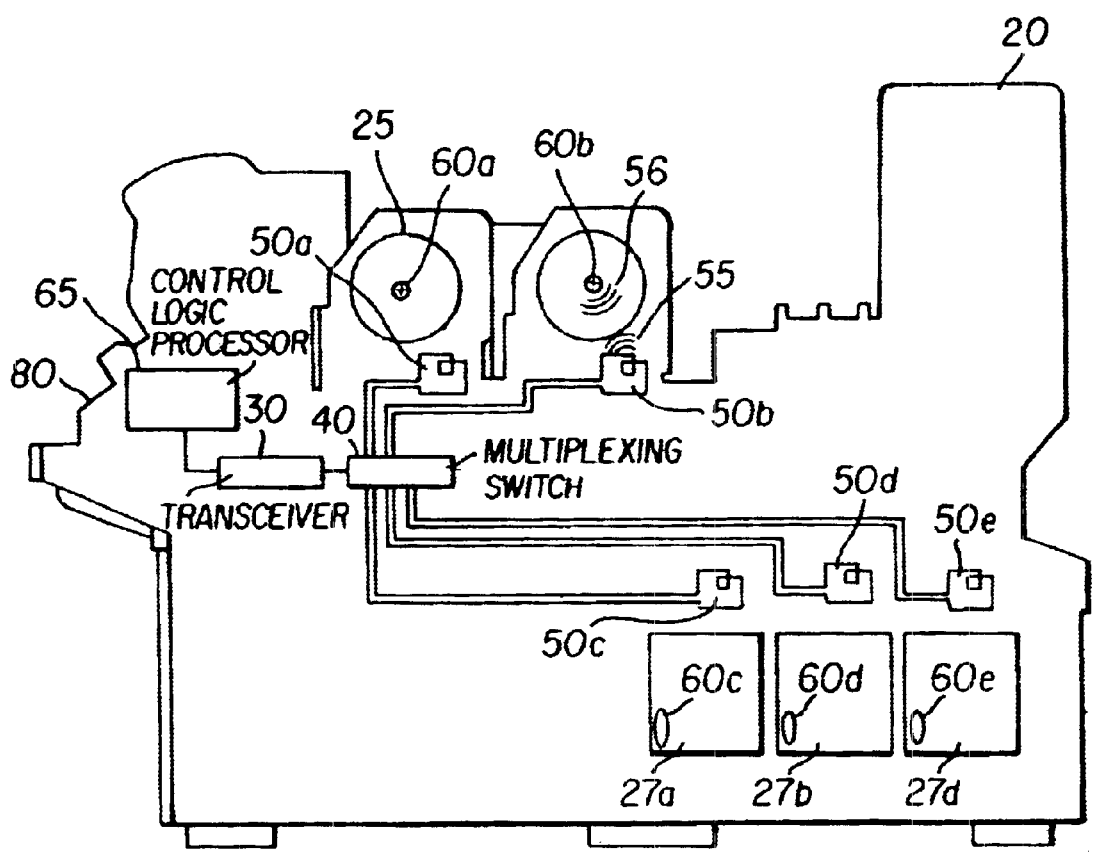
FIG. 2 is a view in elevation of a photoprocessing device belonging to the imaging apparatus.

Referring to FIGS. 1 and 2, there is shown an imaging apparatus, generally referred to as 10, adapted to sense type of an imaging consumable loaded therein. The imaging consumable may be, for example, a photosensitive paper consumable, a developer consumable, a bleach consumable, a fixer consumable, an ink consumable, an electrophotographic toner consumable, an inkjet media consumable, a thermal dye donor web consumable, a thermal dye media consumable, a laminate consumable, an inkjet printhead cleaning fluid consumable or a film consumable.

Referring again to FIGS. 1 and 2, imaging apparatus 10 includes an image forming assembly, such as a photoprocessing device 20, which may be a minilab. Photoprocessing device 20 may be an inkjet printer, a thermal dye printer, a photographic printer, an electrophotographic printer, or the like. By way of example only, and not by way of limitation, the imaging consumables are illustrated as a photosensitive paper 25 and prepackaged chemicals 27a/b/c. In this regard, prepackaged chemicals 27a/b/c may be, for example, "KODAK EKTACOLOR SM CHEMICALS" available from the Eastman Kodak Company located in Rochester, N.Y. Each of the prepackaged chemicals 27a/b/c is provided in an individual package capable of being loaded into photoprocessing device 20.

Again referring to FIGS. 1 and 2, photoprocessing device 20 includes an RF (Radio Frequency) transceiver 30 for reasons disclosed hereinbelow. Transceiver 30 may be a "Model S2000" transceiver available from Texas Instruments, Incorporated, located in Dallas, Tex. Alternatively, transceiver 30 may be a "Model U2270B" transceiver available from Vishay-Telefunken Semiconductors, Incorporated, located in Malvern, PA. In any event, transceiver 30 is connected, by means of a multiplexing switch 40, to a plurality of antennae 50a/b/c/d/e respectively assigned to each of a plurality of consumables 25 and 27a/b/c, as shown. For reasons disclosed in more detail hereinbelow, transceiver 30 serves as an electromagnetic "reader" and is capable of transmitting a first electromagnetic field 55 of a first predetermined radio frequency. Transceiver 30 is also capable of receiving a second electromagnetic field 56 of a second predetermined radio frequency. Typically, the same frequency serves for both the first and second electromagnetic fields 55 and 56.

Still referring to FIGS. 1 and 2, a plurality of RF transponders 60a/b/c/d/e are respectively mounted on each consumable 25 and 27a/b/c. In this regard, each of the transponders 60a/b/c/d/e may be an "SAMPT" (Selective Addressable Multi-Page Transponder), Part Number "RI-TRP-IR2B" available from Texas Instruments, Incorporated. Alternatively, each of the transponders 60a/b/c/d/e may be a "Model TL5550" transponder available from Vishay-Telefunken Semiconductors, Incorporated. RF transponders 60a/b/c/d/e are preferably relatively low-power transponders deriving their power from the first electromagnetic field 55 emitted by antennae 50a/b/c/d/e. This allows transponders 60a/b/c/d/e to be compact and small for reducing size of photoprocessing device 20. By way of example only, and not by way of limitation, transponders 60a/b/c/d/e are generally cylindrical, smaller than 4 mm in diameter and less than 32 mm in length. As described in detail hereinbelow, transponders 60a/b/c/d/e serve as identifiers for characterizing type of consumable loaded into photoprocessing device 20.

As best seen in FIG. 2, transceiver 30 communicates, by means of antennae 50a/b/c/d/e, with each of transponders 60a/b/c/d/e. Transceiver 30 polls a single transponder 60a/b/c/d/e at a time using any of a number of possible multiplexing schemes known in the art. According to the invention, multiplexing switch 40, using techniques and components well-known in the art, makes an electrical connection between a specific antenna 50a, 50b, 50c, 50d or 50e and transceiver 50 in order to respectively poll a specific transponder 60a, 60b, 60c, 60d or 60e. Alternate mechanisms for polling individual transponders 60a, 60b, 60c, 60d or 60e include use of a plurality of microreader modules, such as a "RI-STU-MRD1 Micro-Reader" available from Texas Instruments, Inc. Using this scheme, such a microreader module, connected to a control logic processor 65, would be disposed within apparatus 10 near the location of each transponder 54. The function of such a processor 65 is disclosed in detail hereinbelow. Yet another alternative polling technique employs a "non-collision" algorithm, whereby transceiver 30 successively communicates with multiple transponders 60a, 60b, 60c, 60d or 60e using a sequence of increasing signal strengths and using the capability of transceiver 30 to selectively address and communicate with each transponder 60a, 60b, 60c, 60d or 60e, and then to selectively disable each transponder 60a, 60b, 60c, 60d or 60e individually.

Such a system could require fewer antennae than transponders; provided, however, that the range is sufficient to encompass multiple transponders. Since the transponder has a unique identification, it is possible that only one antenna would be required. This would reduce hardware cost of the system.

Referring again to FIG. 2, transceiver 30 is electrically coupled to the previously mentioned control logic processor 65 by means of a standard interface, such as a RS-232C serial connection. This connection, in conjunction with the polling technique described hereinabove, allows control logic processor 65 to control operation of transceiver 30 so that transceiver 30 can selectively and successively poll individual transponders 60a, 60b, 60c, 60d and 60e in order to access consumable identifying information from each transponder 60a, 60b, 60c, 60d or 60e. As previously mentioned, transponders 60a, 60b, 60c, 60d and 60e correspond to respective ones of consumables 27 and 27a/b/c/e loaded in photoprocessing device 20.

Still referring to FIG. 2, the previously mentioned control logic processor 65 uses an instruction program for controlling timing of the processing sequence of photoprocessing device 20. The instruction program may operate using a number of variables, such as exposure time. In this regard, a default value of exposure time is used for processing in the prior art; however, it is known that exposure time can be variable depending on the type of photosensitive paper being printed upon (for example, glossy or matte finish paper). To address the problem of exposure time varying depending on type of paper being printed upon, the invention includes a memory register in control logic processor 65 that can be written with an alternate exposure time value, based on type of photosensitive paper loaded into photoprocessing device 20. Moreover, it may be appreciated that although the variable used can be exposure time, other suitable variables may also be used, if desired.

Figure 3A:
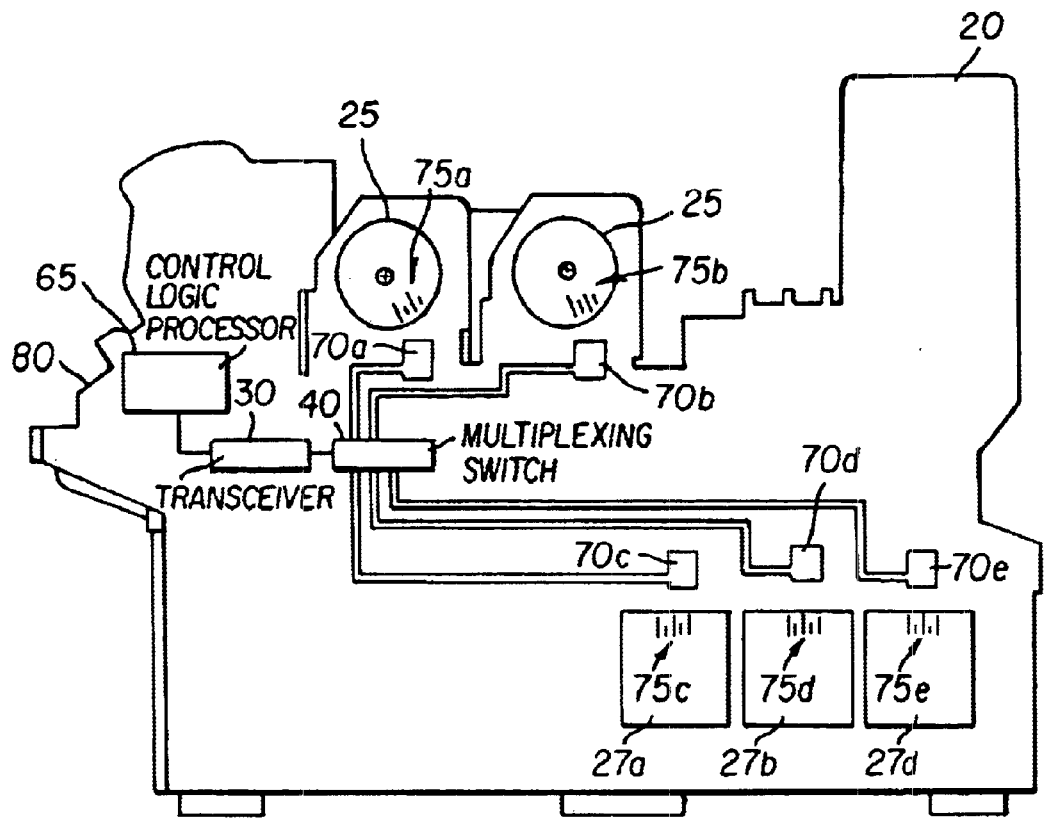
FIG. 3A is a view in elevation of an alternate embodiment of the photoprocessing device.
Figure 3B:
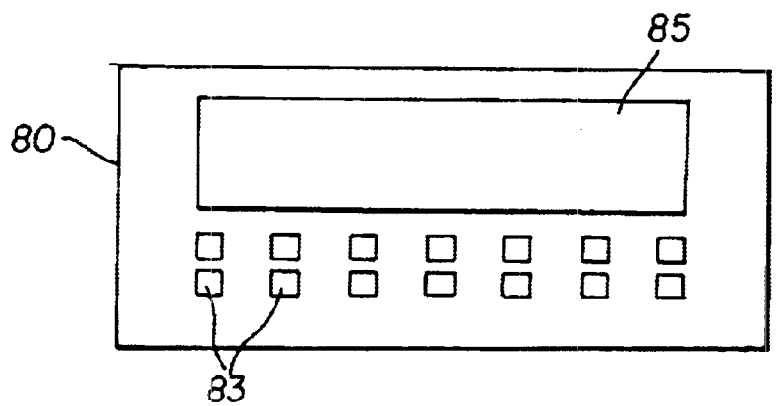
FIG. 3B illustrates a control console belonging to the invention.

Referring to FIGS. 3A and 3B, there is shown an alternate embodiment of the present invention for automated sensing of type of consumables 25 and 27a/b/c/ and identification of the manufactured batch associated with each consumable. According to this alternate embodiment of the invention, a plurality of readers, such as optical bar code readers 70a/b/c/d/e, are disposed within photoprocessing device 20 to optically read respective ones of a plurality of indicia, such as bar codes 75a/b/c/d/e. The bar codes 75a/b/c/d/e are preferably affixed to respective ones of consumables 25 and 27a/b/c. Bar codes 75a/b/c/d/e function as identifiers for characterizing type of consumable 25 and 27a/b/c loaded into photoprocessing device 20. Alternatively, a single bar code reader may be used for scanning of the consumable by the operator prior to loading the consumable in photoprocessing device 20. Moreover, the indicia may be magnetic strips provided on consumables 25 and 27a/b/c (for example, on the consumables packaging). In this regard, readers 70a/b/c/d/e are magnetic strip readers disposed in photoprocessing device 20, which readers 70a/b/c/d/e are capable of reading one or more of the magnetic strips. As yet another alternative, the indicia may be embedded trace patterns readable by suitable readers available in the art.

However, it may be understood that automation of the identification process is not a requirement for the practice of this invention. That is, an operator may read a product and batch code from any of the consumables packages and then enter this identifier information manually on a control console 80 connected to processing device 20. Control console 80 may include a plurality of input keys 83 for operator input of the information. Control console 80 may also include a display panel 85 for displaying the information input by the operator. However, operator error may occur while the operator enters the identifier information. Therefore, automating reading of consumable and batch identifier information is preferred in order to avoid operator error.

In addition, it may be appreciated from the description hereinabove that, when a new consumable package 25, 27a, 27b, 27c and/or 27d is first loaded in photoprocessing device 20, an initial identification sequence takes place. During this initial identification, transponders 60a/b/c/d/e on the newly loaded consumable are initially read and its identifier information stored by control processor 65. This sequence can be operator-initiated, such as by manual entry of an appropriate command through control console 80. Alternately, consumable initialization can be initiated by sensing a mechanical event, such as closing of a door panel during loading of the consumable into photoprocessing device 20 or mechanical detection of presence of the consumable while residing in device 20.

Remote Information Access

Returning to FIG. 1, it is convenient for the operator of photoprocessing device 20 to have access to image forming information directly from the consumables manufacturer. Such image forming information may include, for example, image processing information related to using a specific batch of photosensitive paper or using a specific batch of photofinishing chemical loaded in photoprocessing device 20. To this end, imaging apparatus 10 comprises a remote network access, generally referred to as 85. Network access 85 includes a telecommunications link 90 for reasons disclosed hereinbelow.

Referring again to FIG. 1, photoprocessing device 20 is connected to an intermediary networked server 100 that communicates with control logic processor 65 over a standard interface, such as a RS 232C serial connection. Networked server 100 may be any of a number of standard computer platforms known in the art, such as a personal computer (as shown) configured for Internet connection. Telecommunications link 90 may be any of a number of connections well known in the art. For example, telecommunications link 90 may be implemented using a standard Internet connection. In this regard, telecommunications link 90 may include a telephone line by which a first modem 105a (modulator/demodulator 105) connects networked server 100 to the telephone line for Internet access. First modem 105a, itself may be a separate, free-standing device or integrally incorporated into networked server 100. Moreover, telecommunications link 90 need not be a telephone line; rather, telecommunications link 90 may be formed of electromagnetic waves broadcast by networked server 100 at one or more predetermined radio frequencies.

Of course, not shown in FIG. 1 are "black box" components, well-known in the art, by which an Internet provider utility provides connection service, including any other features necessary, such as firewalls for data security. Because such a system is substantially "hidden" to the Internet user, FIG. 1 necessarily represents all possible implementations of Internet service connection.

Referring yet again to FIG. 1, imaging apparatus 10 further includes a host computer 110 coupled to telecommunications link 90, such as by means of a second modem 105b. Host computer 110 may be located at the site of the consumables manufacturer or at the site of the manufacturer of photoprocessing device 20 and contains computer software logic and data access capabilities for accepting consumables identifier information from a remotely connected photoprocessing device 20. Based on this identifier information, host computer 110 returns processing information to photoprocessing device 20 on the specific consumable loaded in photoprocessing device 20. Host computer 110 can be any of a number of workstation computer platforms, including but not limited to a suitably configured personal computer or UNIX-based workstation.

As illustrated in FIG. 1, host computer, 110 is capable of accessing a consumables information data source 120 that contains detailed test and performance measurements and manufacturing data on each batch of consumable 25 and 27a/b/c. Data source 120 may be stored on host computer 110 or stored on a separate UNIX-based workstation (not shown) running suitable database management software, which software may be, for example, "ORACLE Database" software available from Oracle Corporation, located in Redwood Shores, Calif.

As stated hereinabove, and with reference to FIG. 1, networked access 85 may include an Internet connection. In this regard, a standard HTTP (Hypertext Transfer Protocol) control is employed to provide 2-way communication between remote host computer 110 and networked server 100. This configuration of the present invention allows use of conventional "browser" utilities and user interfaces well-known in the telecommunications art. Here, networked server 100 is accessed by means of its assigned HTTP address. Download of data to networked server 100 in the form of a file is performed by remote host computer 110 using automated scripts, such as stored commands that run an FTP (File Transfer Protocol) session or, alternately, using a sequence of commands manually entered into host computer 110. Consumables image forming information that has been acquired by networked server 100 is stored in memory as a file on networked server 100. Data from remote host computer 110, received by networked server 100 using the same network protocol arrangement, can then be transferred to control logic processor 65 for modifying process variables used in operation of photoprocessing device 20.

Control Schemes

In the preferred embodiment of this invention, control logic processor 65 controls image processing in photoprocessing device 20. Image forming information obtained through telecommunications link 90 from remote host computer 110 provides process variables used by a processing program running locally in control logic processor 65. In this case, control logic processor 65 makes the control decisions. However, this is not,the only possible control scheme. An alternative control scheme employs remote host computer 110 as a decision-making component. In such an alternate control scheme, remote host computer 110 provides operating instructions to control logic processor 65 so as to alter processing based on combination of consumables 25 and 27a/b/c loaded in photoprocessor device 20. This alternate scheme allows a measure of remote control of the imaging process running in photoprocessing device 20. By way of example, in the case of either local or remote control schemes, photoprocessing device 20 may have the following exemplary consumables loaded therein:

(1) roll of photosensitive paper 25 of a Batch No. 458892992 manufactured on Jul. 10, 1998;

(2) packaged developer 27a belonging to a Batch No. 37666299 manufactured on Dec. 12, 1998;

(3) packaged bleach 27b belonging to a Batch No. 566255252 manufactured on Dec. 11, 1998; and (4) packaged fixer 27c belonging to a Batch No. 982882827 manufactured on Nov. 30, 1998.

An exemplary mode of operation will now be described. Therefore, referring to FIGS. 1 and 2, a new roll of the previously mentioned photosensitive paper 25 is loaded into photoprocessing device 20. In response, upon instructions from control logic processor 65, transceiver 30 polls each transponder 60a/b/c/d/e and obtains consumable type and batch number identifier information from each transponder 60a/b/c/d/e. Here, transponders 60a/b/c/d/e function as identifiers for characterizing type of consumables. Also, transceiver 30 functions as a reader for reading the identifier information of each transponder 60a/b/c/d/e. Next, control logic processor 65 transfers this consumables identifier information over its serial link to networked server 100. Networked server 100 stores this consumables data in memory as a file.

Transfer of the file of consumables identifier information from networked server 100 can occur in a number of ways. For example, loading of a new consumable 25, 27a, 27b, 27c and/or 27d can initiate network communication with remote host computer 110 by establishing an FTP session with remote host computer 110. When the FTP session is established, networked server 100 transfers the consumables data file to remote host computer 110. The memory mounted on each of consumables 25 and/or 27a/b/c includes specific network access data needed for addressing host computer 110, such as the correct address, security passwords, and other data that fully automate access to the correct data at remote host computer 110. Storage of the network access data in the memory mounted on the consumable eliminates need for operator interaction to input data and potential operator error in obtaining correct imaging forming information.

In the remote control scheme not requiring operator interaction, software running on remote host computer 110 confirms the data received from control logic processor 65 that is sent by networked server 100 and responds by providing updated manufacturing data on each consumable 25 and 27a/b/c loaded in photoprocessing device 20. By way of example only, and not by way of limitation, image forming information transferred from remote host computer 110 for a roll of photosensitive paper 25 may be any of the exemplary data displayed in Table 1 hereinbelow.

TABLE 1

Data Provided for Roll of Photosensitive Paper 25

| Data Stored | Number of Bits | Description |
| --- | --- | --- |
| Consumable Type Identifier | 8 | An 8-bit number encoding the type of consumable. |
| Product Code | 40 | 10-digit product code. (May not be required if Consumable Type Identifier provides enough data.) |
| Catalog Number | 32 | For example, TG 4745. |
| Manufacture Date | 16 | 16-bit encoded date. Includes 4-bit month, 5-bit day, 7-bit year components. |
| Batch Emulsion Data | 128 | Includes encoded batch number, sensitivity and response data from testing of samples, density benchmark data, sensitometry data obtained for the batch. |
| Sensitometric Data | 128 | Parameter values allowing characterization of sensitometric response for this paper, including exposure/density reciprocity characteristics for each exposure source (such as optical, LED, laser) that could be used with this paper type. |
| Roll length | 16 | 16-bit encoded data on length of roll of photosensitive paper 25 |
| Roll width | 16 | 16-bit encoded data on width of roll of photosensitive paper 25 |

Networked server 100 transfers the file data comprising image forming information to control logic processor 65. Control logic processor 65 then adjusts its processing operation based on the updated imaging forming information received from networked server 100, such as by altering exposure time.

As stated hereinabove, in the alternate remote control scheme, host computer defines the processing operation rather than control logic processor 65. For example, host computer 110 analyzes the identifier information defined by the identifier mounted on loaded consumables 25 and/or 27a/b/c and determines, using a control program that accesses and uses information stored in consumables data source 120, that the combination of consumables 25 and 27a/b/c loaded in photoprocessing device 20 work best together when developer speed in photoprocessing device 20 is increased by approximately 8 per cent. Remote host computer 110 then transmits a file, through telecommunications link 90, as a response message to networked server 100, indicating in the file the recommendation to increase developer speed. Control logic processor 65 then alters processing using this new operating instruction.

Figure 4:
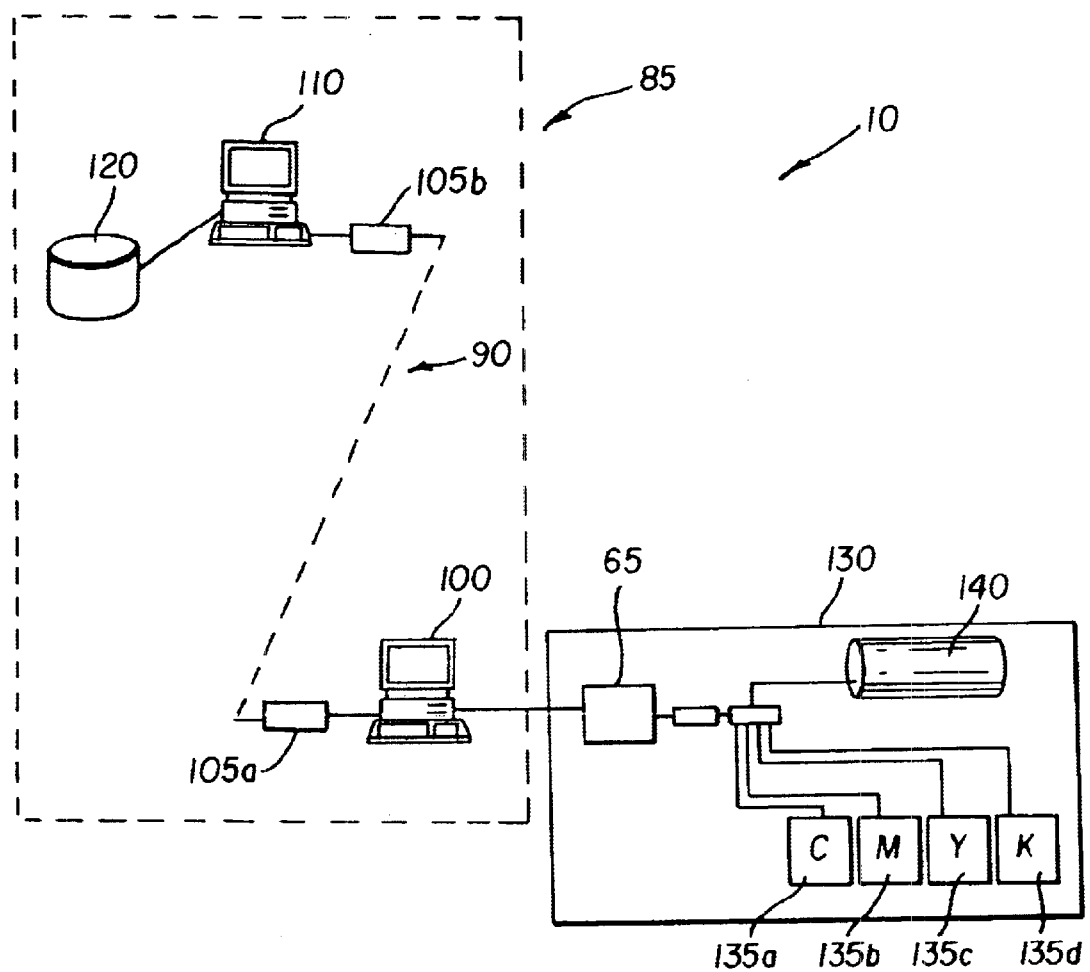
FIG. 4 illustrates an alternative embodiment of the imaging apparatus including the communications link, wherein the photoprocessing device belonging to the imaging apparatus is an inkjet printer.

Turning now to FIG. 4, there is shown another embodiment of the present invention. According to this embodiment of the invention, an inkjet printer 130 is connected to networked access 85 for remote communication with host computer 110. Using a similar arrangement of transceiver 30 and transponders 60a/b/c/d/e, control logic processor 65 in printer 130 senses identity of an ink consumable 135a, 135b, 135c and/or 135d loaded in printer 130 and also senses identity of an inkjet media consumable 140. Control logic processor 65 reports this identifier information by means of telecommunications link 90 to host computer 110. Host computer 110 returns image forming information to printer 130 for optimizing use of consumables 135a/b/c/d and 140 loaded in printer 130. For example, up-to-date sensitometric data from the manufacturer of consumable 135c, which may be a yellow ink consumable, could be used to indicate need to increase ink dot size to boost density in highlight regions of an output image.

Figure 5:
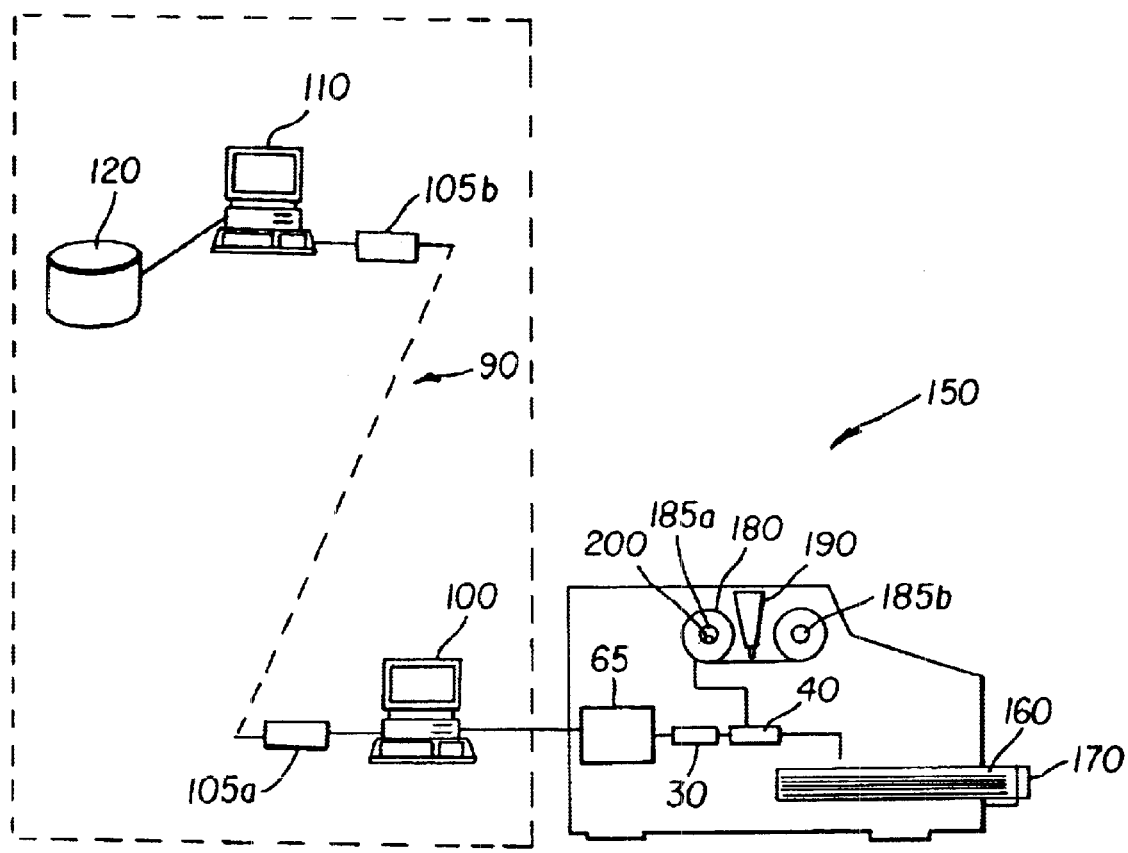
FIG. 5 illustrates still another alternative embodiment of the imaging apparatus including the communications link, wherein the photoprocessing device belonging to the imaging apparatus is a thermal dye printer.

Referring to FIG. 5, there is shown yet another embodiment of the present invention. According to this embodiment of the invention photoprocessing device 20 may alternatively be a thermal dye printer 150. Thermal dye printer 150 creates an image onto a sheet of receiver media 160 residing in a receiver tray 170. Thermal dye printer 150 creates the image by transferring dye from a dye donor ribbon consumable 180 onto receiver 160. Ribbon consumable 180 is illustrated wound about a supply spool 185a and a take-up spool 185b. In this regard, a dye donor patch (not shown) of a particular color (typically cyan, magenta, yellow, or black) on ribbon consumable 180 is placed against receiver media 160. Then, controlled exposure energy from a printhead 190 heats the donor patch as the donor patch is moved into the path of printhead 190. In order to heat the donor patch, printhead 190 may comprise a plurality of thermal resistive heating elements (not shown) or a laser source (also not shown). This heating action causes localized transfer of dye colorant from the donor ribbon patch to receiver media 160 in a pattern that creates the printed image. The amount of exposure energy applied controls how much dye is transferred, which determines color density of the image. An exemplary thermal dye printer is the "KODAK XLS 8600 PS Color Printer" available from the Eastman Kodak Company located in Rochester, N.Y. Previously mentioned transceiver 30 is present in thermal dye printer 150 together with a transponder 210 coupled to either of donor ribbon spools 185a/b. Transceiver 30 and transponder 210 cooperatively function in a manner as previously described.

Figure 6:
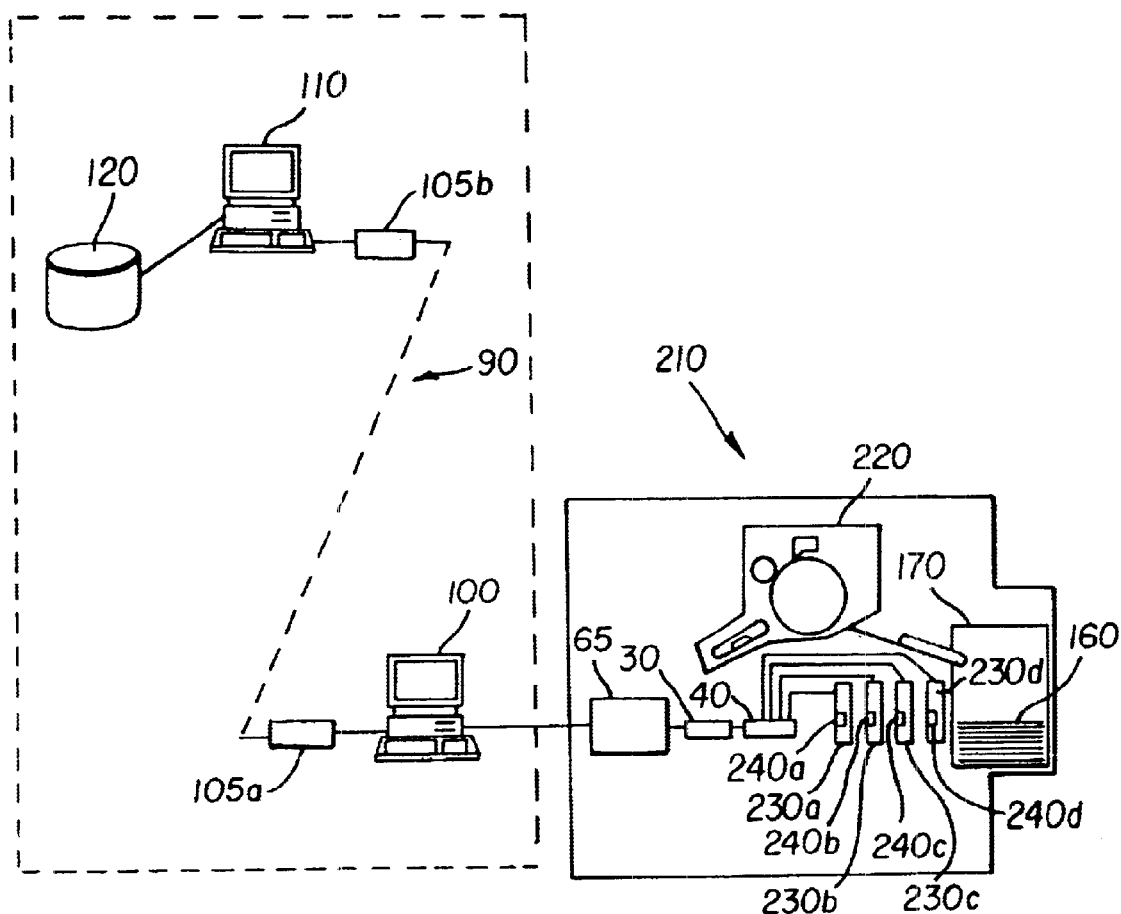
FIG. 6 illustrates an alternative embodiment of the imaging apparatus including the communications link, wherein the photoprocessing device belonging to the imaging apparatus is an electrophotographic printer.

Referring to FIG. 6, there is shown yet another embodiment of the present invention. According to this embodiment of the invention photoprocessing device 20 may alternatively be an electrophotographic printer 210 comprising an image forming assembly 220, which is an electrophotographic printhead, capable of forming an image on sheets of receiver media 160 residing in tray 170. Disposed in printer 210 are a plurality of toner cartridge consumables 230a/b/c/d having toner therein. Coupled to each toner cartridge consumable 230a/b/c/d is a transponder 240a/b/c/d, respectively. Transceiver 30 and transponders 240a/b/c/d cooperatively function in a manner as previously described.

An advantage of the present inventions is that use thereof avoids manual data entry and its concomitant operator errors. This is so because the invention allows automatic reading of consumable identifier information and transmission of that identifier information to a data source containing corresponding image forming information which is then returned to the photoprocessing device (or printer). This up-to-date image forming information is then used to produce quality images.

Another advantage of the present invention is that it provides information on consumables usage that persists even when the consumable is temporarily removed from the imaging apparatus, which may occur, for example, when quantity of consumable is insufficient to satisfy a large production run. In this regard, memory data, variable exposure time and quantity used, can be stored directly with the consumable itself. Thus, when a consumable is removed from photoprocessing device 20, its variables remain stored in non-volatile memory so that these same variables are applied to the photoprocessing sequencing when the consumable is reinserted into photoprocessing device 20. Thus, when a smaller production is later required, the consumable previously removed from the imaging apparatus is reinserted into the imaging apparatus, which automatically identifies the consumable, the exposure time and the quantity of it that remains. This aspect of the invention obtains predictive process information that allows photofinishing and printer optimization with a corresponding decrease in wasted consumable because the consumable removed from the imaging apparatus is not discarded, but rather salvaged. Of course, this result obtains gains in image quality and customer satisfaction.

Yet another advantage of the present invention is that use thereof allows consumables manufacturers to provide their customers with updated imaging information regarding consumables performance after the consumable is manufactured and shipped.

Still another advantage of the present invention is that use thereof predicts interaction results beforehand and adapts operation of the photoprocessing device to consumables loaded therein. That is, earlier techniques for remote management of photoprocessing apparatus respond to process results chiefly by processing control strips and reporting measurements obtained after processing. In contrast, the present invention, by providing imaging information on the consumables loaded in the photoprocessing device, predicts interaction results beforehand, and thereby adapts the operation of photoprocessing device 20 to its consumables, based on information obtained from the consumables manufacturer. In doing so, the present invention offers advantages of increased efficiency, more pleasing printed images, and reduced waste. These advantages apply not only to a photoprocessing device, but also for other imaging apparatus.

The present invention provides these and other advantages without requiring redesign of consumables packaging and without requiring retrofit of existing apparatus for customers which is particularly important to customers who may not yet be ready to make an additional capital investment.

While the invention has been described with particular reference to its preferred embodiments, it is understood by those skilled in the art that various changes may be made and equivalents may be substituted for elements of the preferred embodiments without departing from the invention.

For example, a number of alternate methods for automated sensing and reporting of consumable type and batch identification can be used, including a memory mounted on the consumable and also requiring electrical contact for sensing consumable identifier information stored in memory.

As yet another example, a networking arrangement may be used in combination with a plurality of high-volume photoprocessing systems as well as with digital printers. Such a networking arrangement would allow access to more than one remote host computer, so that the photoprocessing device can obtain imaging forming information about consumables that have been supplied from different manufactures.

As a further example, an operator can be given the option to decide whether or not to use operating instructions downloaded to memory on the control logic processor (or downloaded to memory mounted on the consumable itself) from the remote host. This can include the capability to restore original or default operating parameters to memory, or to prevent writing new data to memory mounted on the consumable, if operating instructions obtained from remote host computer 110 were to result in unsatisfactory operation. The operator can also be given control over the timing of data transfer through the telecommunications link, delaying or deferring network access, until a more convenient time, as well as operating using current or default operating values.

As still another example, type of network connection can vary widely from that disclosed above. That is, the interconnection scheme could alternately use, for example, a local area network, dedicated phone lines, or any other suitable network mechanism. Transmission means could include not only hardwired telecommunications lines but also satellite links.

As another example, the file transfer method and protocol can take any one of a number of variations. That is, the control logic processor may itself be configured with a network address and with the necessary connection hardware and software by providing an Ethernet controller and configuring the controller with an IP address and network connection. This would eliminate need for an intermediary networked server.

The above examples are not intended to limit the nature of communication with remote systems or their response through any specific network means. It can be appreciated that two-way networked communication, coupled with the availability of specific consumables data, allows manufacturers of imaging and photoprocessing consumables to provide photofinishing equipment users and others with image forming information allowing them to produce more aesthetically pleasing images and photographic prints, to reduce waste, and to control overhead and cost of operation.

Therefore, what is provided is a network connection to a host computer for imaging apparatus, so that detailed batch-specific processing information about consumables loaded therein can be obtained from a remote site.

PARTS LIST

10 . . . imaging apparatus
20 . . . photoprocessing device
25 . . . photosensitive paper consumable
27a/b/c . . . prepackaged chemical consumables
30 . . . transceiver
40 . . . multiplexing switch
50a/b/c/d/e . . . antennae
55 . . . first electromagnetic field
56 . . . second electromagnetic field
60a/b/c/d/e . . . transponders
65 . . . control logic processor
70a/b/c/d/e . . . bar code readers
75a/b/c/d/e . . . bar codes
80 . . . control console
83 . . . input keys
85 . . . display panel
85 . . . networked access
90 . . . communications link
100 . . . networked server
105a . . . first modem
105b . . . second modem
110 . . . host computer
120 . . . data source
130 . . . inkjet printer
135a/b/c/d . . . inkjet printer ink consumable
140 . . . inkjet media consumable
150 . . . thermal dye printer
160 . . . sheets of receiver media
170 . . . receiver tray
180 . . . dye donor ribbon consumable
185a . . . donor ribbon supply spool
185b . . . donor ribbon take-up spool
190 . . . printhead disposed in thermal dye printer
200 . . . transponder for thermal dye printer
210 . . . electrophotographic printer
220 . . . electrophotographic printhead 230a/b/c/d . . . toner cartridge consumables
240a/b/c/d . . . transponders for electrophotographic printer

What is claimed is:

1. An imaging apparatus for forming an image consistent with type of imaging consumable loaded therein, comprising:
    (a) an identifier associated with the consumable, said identifier defining identifier information characterizing the type of consumable;
    (b) an image forming assembly for forming the image according to the identifier information;
    (c) a data source remotely disposed with respect to said image forming assembly, said data source containing image forming information corresponding to the identifier information; and
    (d) a telecommunications link and a reader coupled to said telecommunications link, said reader being disposed relative to said identifier for reading the identifier information and for providing the identifier information to said telecommunications link, said reader and telecommunications link linking said identifier to said data source for carrying the identifier information from said identifier to said data source and said telecommunications link linking said data source to said image forming assembly for carrying the image forming information from said data source to said image forming assembly, so that the image is formed consistent with the type of the consumable loaded in said image forming assembly, wherein said reader comprises a transceiver coupled to said telecommunications link, said transceiver being operative to transmit a first electromagnetic field and to sense a second electromagnetic field, the first electromagnetic field containing sufficient power to generate the second electromagnetic field.

2. The apparatus of claim 1, wherein said identifier defines magnetically encoded identifier information readable by said reader.

3. The apparatus of claim 1, wherein said identifier defines the identifier information as an embedded trace pattern readable by said reader.

4. The apparatus of claim 1, wherein said identifier comprises a transponder, said transponder being operative to receive the first electromagnetic field transmitted by said transceiver and generating the second electromagnetic field in response to the first electromagnetic field received thereby, the second electromagnetic field having the identifier information subsumed therein, the second electromagnetic field being received by said transceiver for transmission of the identifier information from said transceiver to said telecommunications link, and the first electromagnetic field providing the power for generating the second magnetic field.

5. The apparatus of claim 4 wherein said transceiver transmits the first electromagnetic field at a predetermined first radio frequency.

6. The apparatus of claim 5 wherein said transponder transmits the second electromagnetic field at a predetermined second radio frequency.

7. The apparatus of claim 1, wherein said data source is operative to process the image forming information after receipt of the identifying information and generates an operating instruction to be carried by said telecommunications link to said image forming assembly for operating said image forming assembly in accordance with the operating instruction.

8. The apparatus of claim 1, further comprising a memory in communication with said telecommunications link for storing the image forming information carried by said telecommunications link, so that the image forming information is subsequently retrievable by said image forming assembly.

9. The apparatus of claim 8, wherein said memory is coupled to said image forming assembly.

10. The apparatus of claim 8, wherein said memory is coupled to said data source.

11. The apparatus of claim 8 wherein said memory is coupled to the consumable.

12. The apparatus of claim 8 wherein said memory is coupled to a photosensitive paper consumable.

13. The apparatus of claim 8 wherein said memory is coupled to a developer consumable.

14. The apparatus of claim 8 wherein said memory is coupled to a bleach consumable.

15. The apparatus of claim 8 wherein said memory is coupled to a fixer consumable.

16. The apparatus of claim 8 wherein said memory is coupled to an ink consumable.

17. The apparatus of claim 8 wherein said memory is coupled to an electrophotographic toner consumable.

18. The apparatus of claim 8 wherein said memory is coupled to an inkjet media consumable.

19. The apparatus of claim 8 wherein said memory is coupled to a thermal dye donor web consumable.

20. The apparatus of claim 8, wherein said memory is coupled to a thermal dye media consumable.

21. The apparatus of claim 8 wherein said memory is coupled to a laminate consumable.

22. The apparatus of claim 8 wherein said memory is coupled to an inkjet printhead cleaning fluid consumable.

23. The apparatus of claim 8 wherein said memory is coupled to a film consumable.

24. The apparatus of claim 8, wherein said telecommunications link comprises a computer.

25. The apparatus of claim 24 wherein said memory is coupled to said computer.

26. The apparatus of claim 1 wherein said image forming assembly is an inkjet printer.

27. The apparatus of claim 1 wherein said image forming assembly is a thermal dye printer.

28. The apparatus of claim 1 wherein said image forming assembly is a photographic printer.

29. The apparatus of claim 1 wherein said image forming assembly is an electrophotographic printer.

30. An imaging apparatus for forming an image consistent with type of imaging consumable loaded therein, comprising:
    (a) an identifier associated with the consumable, said identifier defining identifier information characterizing the type of consumable;
    (b) an image forming assembly for forming the image according to the identifier information;
    (c) a data source remotely disposed with respect to said image forming assembly, said data source containing image forming information corresponding to the identifier information; and
    (d) a telecommunications link linking said identifier to said data source for carrying the identifier information from said identifier to said data source and linking said data source to said image forming assembly for carrying the image forming information from said data source to said image forming assembly, so that the image is formed consistent with the type of the consumable loaded in said image forming assembly; and
    (e) an input device coupled to said telecommunications link and adapted for manual entry of the identifier information into said telecommunications link.

31. An imaging apparatus for forming an image consistent with type of imaging consumable loaded therein, comprising:

(a) an identifier associated with the consumable, said identifier defining identifier information characterizing the type of consumable;

(b) an image forming assembly for forming the image according to the identifier information;

(c) a data source remotely disposed with respect to said image forming assembly, said data source containing image forming information corresponding to the identifier information; and (d) a telecommunications link linking said identifier to said data source for carrying the identifier information from said identifier to said data source and linking said data source to said image forming assembly for carrying the image forming information from said data source to said image forming assembly, so that the image is formed consistent with the type of the consumable loaded in said image forming assembly and wherein said telecommunications link carries HTTP protocol signals.

32. A method of operating an imaging apparatus for forming an image consistent with type of imaging consumable loaded therein, comprising the steps of:

(a) providing an identifier defining identifier information characterizing the type of consumable;

(b) providing an image forming assembly and forming the image according to the identifier information;

(c) remotely disposing a data source with respect to the image forming assembly, the data source containing image forming information corresponding to the identifier information;

(d) providing a telecommunications link and linking the identifier to the data source for carrying the identifier information from the identifier to the data source and linking the data source to the image forming assembly for carrying the image forming information from the data source to the image forming assembly, so that the image is formed consistent with the type of the consumable loaded in the image forming assembly; and (e) providing a reader that is coupled to the telecommunications link and the reader being disposed relative to the identifier so as to read the identifier information and provided the identifier information to the telecommunications link wherein the reader comprises a transceiver that is coupled to the telecommunications link, the transceiver transmitting a first electromagnetic field and sensing a second electromagnetic field, the first electromagnetic field having sufficient power to provide the energy for generating the second electromagnetic field.

33. The method of claim 32, wherein the step of providing an identifier comprises the step of providing an identifier defining magnetically encoded identifier information readable by the reader.

34. The method of claim 32, wherein the step of providing an identifier comprises the step of providing an identifier defining the identifier information as an embedded trace pattern readable by the reader.

35. The method of claim 32, wherein the step of providing an identifier comprises the step of providing a transponder, the transponder capable of receiving the first electromagnetic field transmitted by the transceiver and generating the second electromagnetic field in response to the first electromagnetic field received thereby, the second electromagnetic field having the identifier information subsumed therein, the second electromagnetic field being received by the transceiver for transmission of the identifier information from the transceiver to the telecommunications link.

36. An imaging method for forming an image consistent with type of imaging consumable loaded therein, comprising:

(a) providing an identifier associated with the consumable, said identifier defining identifier information characterizing the type of consumable;

(b) providing an image forming assembly and operating the image forming assembly to form the image according to the identifier information;

(c) providing a data source remotely disposed with respect to said image forming assembly, said data source containing image forming information corresponding to the identifier information;

(d) providing a telecommunications link and linking said identifier to said data source through said link for carrying the identifier information from said identifier to said data source and linking said data source to said image forming assembly for carrying the image forming information from said data source to said image forming assembly, so that the image is formed consistent with the type of the consumable loaded in said image forming assembly; and (e) providing an input device coupled to said telecommunications link and using the input device to provide manual entry of the identifier information into said telecommunications link.

37. An imaging method for forming an image consistent with type of imaging consumable loaded therein, comprising:

(a) an identifier associated with the consumable, said identifier defining identifier information characterizing the type of consumable;

(b) an image forming assembly for forming the image according to the identifier information;

(c) a data source remotely disposed with respect to said image forming assembly, said data source containing image forming information corresponding to the identifier information; and (d) a telecommunications link linking said identifier to said data source for carrying the identifier information from said identifier to said data source and linking said data source to said image forming assembly for carrying the image forming information from said data source to said image forming assembly, so that the image is formed consistent with the type of the consumable loaded in said image forming assembly and wherein said telecommunications link carries HTTP protocol signals.

38. An imaging method for forming an image consistent with type of imaging consumable loaded therein, comprising:

(a) an identifier associated with the consumable, said identifier defining identifier information characterizing the type of consumable;

(b) an image forming assembly for forming the image according to the identifier information;

(c) a data source remotely disposed with respect to said image forming assembly, said data source containing image forming information corresponding to the identifier information; and (d) a telecommunications link linking said identifier to said data source for carrying the identifier information from said identifier to said data source and linking said data source to said image forming assembly for carrying the image forming information from said data source to said image forming assembly, so that the image is formed consistent with the type of consumable loaded in said image forming assembly and wherein said telecommunications is compatible with HTTP protocol signals.

* * * * *